(12) United States Patent
Zhang et al.

(10) Patent No.: US 9,989,188 B2
(45) Date of Patent: Jun. 5, 2018

(54) WEAR-HEAT-RESISTANT ANTI-BACTERIAL ANTI-FOULING STEEL WIRE FRAMED PIPE AND MANUFACTURING METHOD THEREOF

(71) Applicant: Kangtai plastic science & Technology Group Co., Ltd., Chongzhou, Sichuan (CN)

(72) Inventors: Shuangquan Zhang, Sichuan (CN); Hongbo Hao, Sichuan (CN)

(73) Assignee: Kangtai plastic science & Technology Group Co., Ltd., Changzhou, Sichuan (CN)

( * ) Notice: Subject to any disclaimer, the term of this patent is extended or adjusted under 35 U.S.C. 154(b) by 31 days.

(21) Appl. No.: 15/289,413

(22) Filed: Oct. 10, 2016

(65) Prior Publication Data
US 2017/0030492 A1 Feb. 2, 2017

(30) Foreign Application Priority Data

Jun. 23, 2016 (CN) .......................... 2016 1 0475915

(51) Int. Cl.
*F16L 9/14* (2006.01)
*F16L 58/10* (2006.01)
(Continued)

(52) U.S. Cl.
CPC ...... *F16L 58/1009* (2013.01); *B29C 47/0023* (2013.01); *B29C 47/0052* (2013.01); *B29C 47/021* (2013.01); *B29C 47/065* (2013.01); *F16L 9/147* (2013.01); *F16L 57/06* (2013.01); *B29C 35/049* (2013.01); *B29C 63/0021* (2013.01); *B29C 2035/0822* (2013.01); *B29C 2035/0877* (2013.01); *B29K 2023/06* (2013.01);
(Continued)

(58) Field of Classification Search
CPC ........ B29C 47/0023; F16L 9/147; F16L 57/06
USPC ..... 138/133, 134, 131, 140, 141; 428/36.91, 428/35.8, 35.9
See application file for complete search history.

(56) References Cited

U.S. PATENT DOCUMENTS

| 6,213,155 B1 * | 4/2001 | Furuta | F16L 11/02 138/123 |
| 8,439,085 B2 * | 5/2013 | Liebson | D06F 58/20 138/125 |

(Continued)

*Primary Examiner* — Patrick F Brinson

(57) ABSTRACT

A wear-heat-resistant anti-bacterial anti-fouling steel wire framed pipe and a manufacturing method thereof are provided. The steel wire framed pipe includes: an anti-bacterial anti-fouling inner layer, an enhancement layer and a wear-heat-resistant outer layer from inside to outside in turn, wherein: the anti-bacterial anti-fouling inner layer is made from antifouling and antibacterial composite modified polyethylene; the wear-heat-resistant outer layer is made from wear-resistant cross-linked modified PE-RT; the enhancement layer includes an interlayer and two steel wire gauze layers respectively coating on an inner surface and an outer surface of the interlayer, and the interlayer is respectively bonded with the anti-bacterial anti-fouling inner layer and the wear-heat-resistant outer layer via hot-melt adhesive. The steel wire framed pipe provided by the present invention has high structural strength, wear-resistance, heat-resistance, and anti-bacterial and anti-fouling properties.

7 Claims, 1 Drawing Sheet

(51) Int. Cl.
  *B29C 47/00* (2006.01)
  *B29C 47/02* (2006.01)
  *F16L 57/06* (2006.01)
  *B29C 47/06* (2006.01)
  *F16L 9/147* (2006.01)
  *B29C 63/00* (2006.01)
  *B29C 35/04* (2006.01)
  *B29C 35/08* (2006.01)
  *B29K 305/12* (2006.01)
  *B29K 105/00* (2006.01)
  *B29K 509/00* (2006.01)

(52) U.S. Cl.
  CPC .. *B29K 2105/0005* (2013.01); *B29K 2305/12* (2013.01); *B29K 2509/00* (2013.01); *B29K 2995/0016* (2013.01); *B29K 2995/0087* (2013.01); *F16L 2201/44* (2013.01)

(56) References Cited

U.S. PATENT DOCUMENTS

| | | | |
|---|---|---|---|
| 2006/0093769 A1* | 5/2006 | Biebuyck | B32B 1/08 428/36.91 |
| 2007/0220732 A1* | 9/2007 | Liebson | D06F 58/20 29/458 |
| 2010/0101292 A1* | 4/2010 | Biris | B21C 23/005 72/46 |
| 2013/0192708 A1* | 8/2013 | Strunk | F16L 11/1185 138/121 |

* cited by examiner

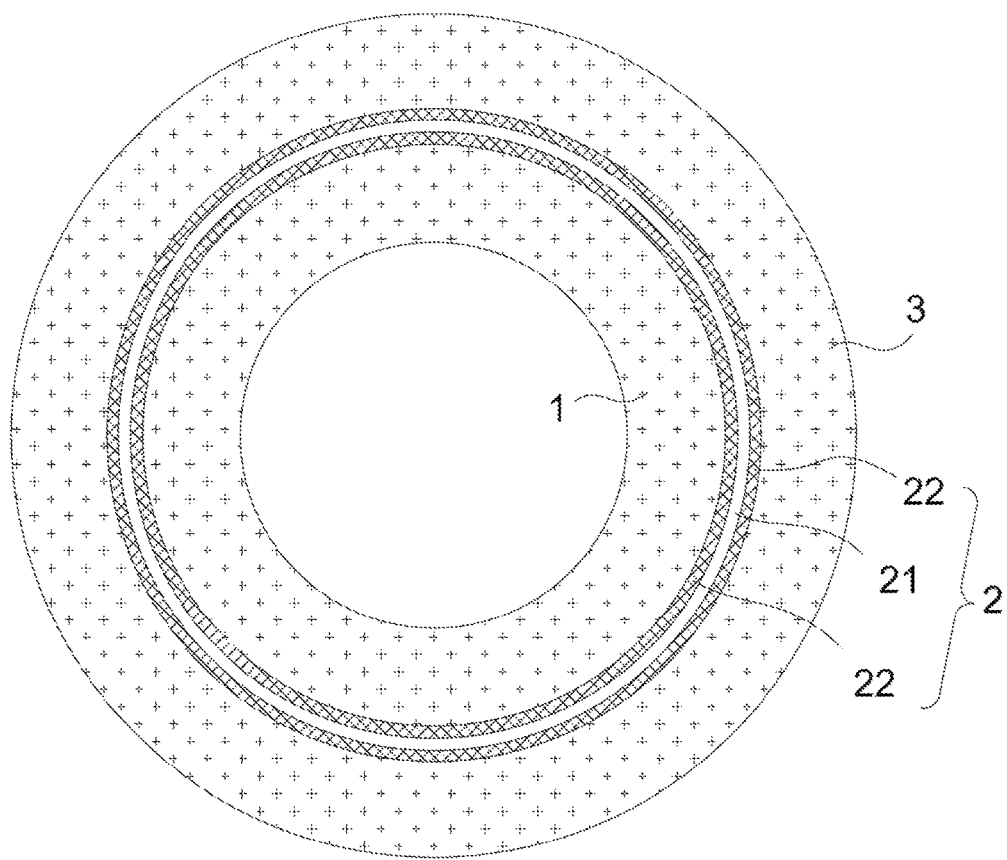

WEAR-HEAT-RESISTANT ANTI-BACTERIAL ANTI-FOULING STEEL WIRE FRAMED PIPE AND MANUFACTURING METHOD THEREOF

CROSS REFERENCE OF RELATED APPLICATION

The present invention claims priority under 35 U.S.C. 119(a-d) to CN 201610475915.7, filed Jun. 23, 2016.

BACKGROUND OF THE PRESENT INVENTION

Field of Invention

The present invention relates to a technical field of plastic pipe, and more particularly to a wear-heat-resistant antibacterial anti-fouling steel wire framed pipe and a manufacturing method thereof.

Description of Related Arts

Currently, due to high strength, beauty and practicability, convenient installation and maintenance, and long service life, the steel wire framed pipe has been widely used in various industries. However, in the course of construction, it is easy to scratch the outer layer of the steel wire framed pipe, so that the steel wire framed pipe is slowly or rapidly cracked after being scratched, thereby affecting the service life and the compressive strength. Simultaneously, the wear resistance is relatively poor. In the process of long-term water supply, due to long usage time, it is easy to form fouling and breed bacteria on the inner layer of the pipe.

Chinese patent CN 201110061496.X disclosed a PE-RT steel wire framed composite pipe, a manufacturing method and an application thereof. The composite pipe comprises five layers, which are successively from inside to outside, a PE-RT inner layer, a hot-melt adhesive inner layer, a steel wire framed enhancement layer, a hot-melt adhesive outer layer and a PE-RT outer layer. It mainly utilizes the PE-RT (polyethylene of raised temperature resistance) material to improve the heat resistance of the pipe, and however, the wear-resistance, fouling-resistance, antibacterial property, and cracking resistance of the steel wire framed composite pipe are still unable to be resolved.

SUMMARY OF THE PRESENT INVENTION

An object of the present invention is to provide a wear-heat-resistant anti-bacterial anti-fouling steel wire framed pipe and a manufacturing method thereof for solving the problems in the above-mentioned prior arts, so as to effectively improve the wear-resistance, heat-resistance, antibacterial property and fouling-resistance of the steel wire framed pipe.

Accordingly, in order to accomplish the above object, the present invention adopts technical solutions as follows.

A wear-heat-resistant anti-bacterial anti-fouling steel wire framed pipe, provided by the present invention, comprises: an anti-bacterial anti-fouling inner layer, an enhancement layer and a wear-heat-resistant outer layer from inside to outside in turn, wherein: the anti-bacterial anti-fouling inner layer is made from antifouling and antibacterial composite modified polyethylene; the wear-heat-resistant outer layer is made from wear-resistant cross-linked modified PE-RT; the enhancement layer comprises an interlayer and two steel wire gauze layers respectively coating on an inner surface and an outer surface of the interlayer, and the interlayer is respectively bonded with the anti-bacterial anti-fouling inner layer and the wear-heat-resistant outer layer via hot-melt adhesive.

Preferably, the interlayer is made from a mixing material which comprises PE-RT, silane coupling agent, and $SiO_2$ with a weight ratio of (50-100):(0.1-5.0):(0.1-8.0).

Preferably, the anti-bacterial anti-fouling inner layer is made from a mixing material which comprises polyethylene, silicone powders, antibacterial agent, silane coupling agent and $SiO_2$ with a weight ratio of (50-100):(0.5-10):(0.1-10):(0.1-5.0):(0.1-5.0).

Preferably, the wear-heat-resistant outer layer is made from a mixing material which comprises PE-RT, $SiO_2$, cross-linking agent, antioxidant, and silane coupling agent with a weight ratio of (50-100):(0.1-10):(0.2-0.8):(0.2-1.0):(0.1-5.0).

Preferably, the wear-heat-resistant outer layer is made from a mixing material which comprises PE-RT, silane cross-linking agent, antioxidant, and silane coupling agent with a weight ratio of (50-100):(0.1-8.0):(0.2-1.0):(0.1-5.0).

Preferably, the wear-heat-resistant outer layer is made from a mixing material which comprises PE-RT, triallyl isocyanurate, antioxidant, and $SiO_2$ with a weight ratio of (50-100):(1.0-8.0):(0.1-1.0):(0.1-10.0).

The present invention also provides a manufacturing method of the wear-heat-resistant anti-bacterial anti-fouling steel wire framed pipe, comprising steps of:

step (S11): firstly extruding steel wire via an extruder at 160-250° C., and coating a PE-RT plastic layer with a thickness of 0.1-2.0 mm on a surface of the steel wire to act as a vertically and horizontally winding plasticized steel wire on standby; and step (S12): obtaining a pipe type embryo by extruding a mixing material which has the above chemical composition by weight and is made into an anti-bacterial anti-fouling inner layer through an extruder, cooling and shaping to form an inner layer pipe, coating the vertically and horizontally winding plasticized steel wire on an external surface of the inner layer pipe, heating a surface of the coated pipe with infrared rays at 250-285° C., coating a layer of hot-melt adhesive on a surface of the heated pipe by extruding, and then coating an interlayer by extruding, which is made from a mixing material with the above chemical composition by weight, coating the vertically and horizontally winding plasticized steel wire on the interlayer, and then heating with infrared rays at 250-285° C., and then coating a layer of hot-melt adhesive by extruding to obtain an intermediate pipe, heat-processing a surface of the intermediate pipe, recombining a wear-heat-resistant outer layer which is made from a mixing material with the above chemical composition by weight, cooling and finalizing a design to form the steel wire framed pipe; wherein:

technological conditions of the wear-heat-resistant outer layer are: a mixing temperature of 40-60° C., a cooling temperature of 25-32° C., a pipe production and processing temperature of 160-260° C., and a pipe production speed of 0.5-3.0 meter/minute.

Preferably, a manufacturing method of the wear-heat-resistant anti-bacterial anti-fouling steel wire framed pipe comprises steps of:

Step (S11): firstly extruding steel wire via an extruder at 160-250° C., and coating a PE-RT plastic layer with a thickness of 0.1-2.0 mm on a surface of the steel wire to act as a vertically and horizontally winding plasticized steel wire on standby; and Step (S12): obtaining a pipe type embryo by extruding a mixing material which has the above chemical composition by weight and is made into an anti-bacterial anti-fouling inner layer through an extruder, cooling and shaping to form an inner layer pipe, coating the vertically and horizontally winding plasticized steel wire on an external surface of the inner layer pipe, and then coating a layer of hot-melt adhesive by extruding, and then coating an interlayer by extruding which is made from a mixing material with the above chemical composition by weight, coating the vertically and horizontally winding plasticized steel wire on a surface of the interlayer, and then coating a layer of hot-melt adhesive by extruding to obtain an intermediate pipe, heat-processing a surface of the intermediate pipe, recombining a wear-heat-resistant outer layer which is made from a mixing material with the above chemical composition by weight, cooling and finalizing a design to form the steel wire framed pipe; wherein:

technological conditions of the wear-heat-resistant outer layer are: a mixing temperature of 40-60° C., a cooling temperature of 25-32° C., a pipe production and processing temperature of 160-260° C., and a pipe production speed of 0.5-3.0 meter/minute.

After completing the composite pipe, two ends of the pipe within a range of 0.02-0.5 mm are coated with a coating water jacket at a water temperature of 1-10° C., a rest of the pipe without coating the coating water jacket is placed under a steam environment of 80-100° C. for 2-24 hours, for completing an automatic cross-linking.

Preferably, a manufacturing method of the wear-heat-resistant anti-bacterial anti-fouling steel wire framed pipe comprises steps of:

step (S21): firstly extruding steel wire through an extruder at 160-250° C., and coating a PE-RT plastic layer with a thickness of 0.1-2.0 mm on a surface of the steel wire to act as a vertically and horizontally winding plasticized steel wire on standby;

step (S22): obtaining a pipe type embryo by extruding a mixing material which has the above chemical composition by weight and is made into an anti-bacterial anti-fouling inner layer through an extruder, cooling and forming an inner layer pipe, coating the vertically and horizontally winding plasticized steel wire on the inner layer pipe, and then coating a layer of hot-melt adhesive by extruding, and then coating an interlayer by extruding which is made from a mixing material with the above chemical composition by weight, coating the vertically and horizontally winding plasticized steel wire on the interlayer, and then coating a layer of hot-melt adhesive by extruding to obtain an intermediate pipe, heat-processing a surface of the intermediate pipe, recombining a wear-heat-resistant outer layer which is made from a mixing material with the above chemical composition by weight, cooling and finalizing a design, wherein:

technological conditions of the wear-heat-resistant outer layer are: a mixing temperature of 40-60° C., a mixing cooling temperature of 25-32° C., a pipe production and processing temperature of 150-250° C., and a pipe production speed of 0.5-3.0 meter/minute; and step (S23): respectively sheltering two ends of the cooled and finalized pipe within a range of 0.02-0.5 mm, and then under an electron beam energy of 1.5-5.0 MEV, a radiation dose of 100-180 KGY, a radiation dose rate of 11-19 KGY/min, radially cross-linking a surface of the pipe, through an electron accelerator, to obtain a non-melting pipe with a three-dimensional net structure, wherein: a crosslink thickness of the surface of the non-melting pipe is larger than and equal to 1.5 mm.

Preferably, technological conditions of the anti-bacterial anti-fouling inner layer are: a mixing temperature of 40-60° C., a mixing cooling temperature of 25-32° C., a pipe production and processing temperature of 160-250° C., a pipe production speed of 0.5-3.0 meter/minute, and a cooling water temperature of 15-32° C.

Technological conditions of the interlayer are that: the plasticized steel wire is heated with infrared rays at 250-285° C., wherein: a mixing temperature is 40-60° C., a mixing cooling temperature is 25-32° C., a pipe production and processing temperature is 160-250° C., and an extruding speed of the interlayer synchronically matches that of the anti-bacterial anti-fouling inner layer.

By the technical solutions mentioned above, the present invention has some beneficially effects as follows:

1. The interlayer is enhanced by the steel wire frame, the steel wire frame comprises one or more layers of steel wires, and the inner layer of the steel wire framed pipe is the anti-bacterial anti-fouling inner layer. Compared with the existing pipes, the steel wire framed pipe, provided by the present invention, is significantly improved on the compressive strength, and has the use working pressure of 1.0-3.0 MPa and the long-term working pressure of 4.5-8.0 MPa.

2. The surface of the pipe is chemically cross-linked, silane cross-linked or radially cross-linked through heat-resistant PE-RT, so the three-dimensional net structure is formed. The surface of the pipe provided by the present invention has better heat-resistance, wear-resistance, ageing resistance and crack resistance than the existing PE-RT steel wire framed pipes. It has better heat-resistance, wear-resistance, corrosion resistance, ageing resistance and crack resistance than the existing polyethylene steel wire framed enhancement pipes. It cross-links to form the three-dimensional net structure, so that even if chronically contacting the air, no inflection aging occurs. It has better compressive strength than the simple cross-linking polyethylene, PE-RT and polyethylene pipes. Simultaneously, the surface scratch-resistant slow-cracking and rapid-cracking ability of the pipe of the present invention is 50-100% higher than that of the existing PE-RT and polyethylene steel wire framed enhancement pipes.

3. The antifouling ability of the inner layer of the pipe, provided by the present invention, is 50-100% higher than that of the existing pipes. Simultaneously, the inner layer of the pipe, provided by the present invention, has the anti-bacterial function, thus maintaining the better long-term health performance to ensure the water with higher quality. Furthermore, a material containing silicon is added to the pipe, so the pipe provided by the present invention has the better rigidity, compressive strength and corrosion resistance than the existing pressure pipes.

These and other objectives, features, and advantages of the present invention will become apparent from the following detailed description, the accompanying drawings, and the appended claims.

BRIEF DESCRIPTION OF THE DRAWINGS

The drawing is a sectional view of a steel wire framed pipe according to a preferred embodiment of the present invention.

In the drawing: 1, anti-bacterial anti-fouling inner layer; 2, enhancement layer; 21, interlayer; 22, steel wire gauze layer; 3, wear-heat-resistant outer layer.

DETAILED DESCRIPTION OF THE PREFERRED EMBODIMENT

Referring to the drawing, a wear-heat-resistant anti-bacterial anti-fouling steel wire framed pipe is illustrated which comprises: an anti-bacterial anti-fouling inner layer 1, an enhancement layer 2 and a wear-heat-resistant outer layer 3 from inside to outside in turn, wherein: the anti-bacterial anti-fouling inner layer 1 is made from antifouling and antibacterial compositely modified polyethylene; the wear-heat-resistant outer layer 3 is made from wear-resistant cross-linked modified PE-RT (polyethylene of raised temperature resistance); the enhancement layer 2 comprises an interlayer 21 and two steel wire gauze layers 22 respectively coating on an inner surface and an outer surface of the interlayer 21, and the interlayer 21 is respectively bonded with the anti-bacterial anti-fouling inner layer 1 and the wear-heat-resistant outer layer 3 via hot-melt adhesive.

According to different cross-linking methods, the wear-heat-resistant outer layer 3 is made from a mixing material which has different compositions. When a chemical cross-linking method is adopted, in the steel wire framed pipe provided by the present invention:

the wear-heat-resistant outer layer 3 is made from a mixing material which comprises PE-RT, $SiO_2$, cross-linking agent, antioxidant, and silane coupling agent with a weight ratio of (50-100):(0.1-10):(0.2-0.8):(0.2-1.0):(0.1-5.0);

the anti-bacterial anti-fouling inner layer 1 is made from a mixing material which comprises polyethylene, silicone powders, antibacterial agent, silane coupling agent and $SiO_2$ with a weight ratio of (50-100):(0.5-10):(0.1-10):(0.1-5.0):(0.1-5.0);

the interlayer 21 is made from a mixing material which comprises PE-RT, silane coupling agent, and $SiO_2$ with a weight ratio of (50-100):(0.1-5.0):(0.1-8.0).

When a silane cross-linking method is adopted, in the steel wire framed pipe provided by the present invention:

the wear-heat-resistant outer layer 3 is made from a mixing material which comprises PE-RT, silane cross-linking agent, antioxidant, and silane coupling agent with a weight ratio of (50-100):(0.1-8.0):(0.2-1.0):(0.1-5.0);

the anti-bacterial anti-fouling inner layer 1 is made from a mixing material which comprises polyethylene, silicone powders, antibacterial agent, silane coupling agent and $SiO_2$ with a weight ratio of (50-100):(0.5-10):(0.1-10):(0.1-5.0):(0.1-5.0);

the interlayer 21 is made from a mixing material which comprises PE-RT, silane coupling agent, and $SiO_2$ with a weight ratio of (50-100):(0.1-5.0):(0.1-8.0).

When a radial cross-linking method is adopted, in the steel wire framed pipe provided by the present invention:

the wear-heat-resistant outer layer 3 is made from a mixing material which comprises PE-RT, triallyl isocyanurate, antioxidant, and $SiO_2$ with a weight ratio of (50-100):(1.0-8.0):(0.1-1.0):(0.1-10);

the anti-bacterial anti-fouling inner layer 1 is made from a mixing material which comprises polyethylene, silicone powders, antibacterial agent, silane coupling agent and $SiO_2$ with a weight ratio of (50-100):(0.5-10):(0.1-10):(0.1-5.0):(0.1-5.0);

the interlayer 21 is made from a mixing material which comprises PE-RT, silane coupling agent, and $SiO_2$ with a weight ratio of (50-100):(0.1-5.0):(0.1-8.0).

The cross-linking agent, in the chemical cross-linking method adopted by the present invention, is the conventional cross-linking agent in this field. Preferably, the cross-linking agent is dicumyl peroxide.

The antioxidant adopted by the present invention is the conventional antioxidant in this field. Preferably, the antioxidant is selected from a group consisting of tetra [β-(3,5-di-tert-butyl-4-hydroxyphenyl) propionate] pentaerythritol ester, β-(3,5-di-tert-butyl-4-hydroxyphenyl) propionic acid ester of octadecanol, phosphite tri-(2,4-di-tert-butyl benzene) ester, tris (2,4-di-tert-butyl) phenyl phosphite, butyl hydroxyl anisd, and dibutyl hydroxy toluene.

The silane coupling agent and the silane cross-linking agent adopted by the present invention are conventional agents in this field.

Preferably, the silane coupling agent is N-(β-aminoethyl) amino-gamma-aminopropyltriethoxysilane.

Preferably, the silane cross-linking agent is methyl triethoxysilane or methyltris(methylethylketoximino)silane.

The antibacterial agent adopted by the present invention comprises inorganic antibacterial agent and organic antibacterial agent.

Preferably, the inorganic antibacterial agent is selected from a group consisting of silver ion, zinc oxide, copper oxide, ammonium dihydrogen phosphate, and lithium carbonate.

The organic antibacterial agent is selected from a group consisting of vanillin, ethyl vanillin aldehyde, acyl anilines, imidazoles, quaternary ammonium salts, and phenolic compounds.

Preferably, the organic antibacterial agent is selected from a group consisting of vanillin, ethyl vanillin, acetanilide, miconazole, dodecyl trimethyl ammonium chloride and phenol.

To improve the structural strength of the steel wire framed pipe, the interlayer 21 has a multi-layer structure, the steel wire gauze layer 22 is located between two interlayers and bonded with each other via hot-melt adhesive.

Aiming at different cross-linking methods of the wear-heat-resistant outer layer 3, the present invention provides two methods for manufacturing the steel wire framed pipe. When the chemical cross-linking method is applied to the wear-heat-resistant outer layer 3, a manufacturing method of the steel wire framed pipe comprises steps of:

step (S11): firstly extruding steel wire via an extruder at 160-250° C., and coating a PE-RT plastic layer with a thickness of 0.1-2.0 mm on a surface of the steel wire to act as a vertically and horizontally winding plasticized steel wire on standby; and step (S12): obtaining a pipe type embryo by extruding a mixing material which is made into an anti-bacterial anti-fouling inner layer 1 and comprises polyethylene, silicone powders, antibacterial agent, silane coupling agent and $SiO_2$ with a weight ratio of (50-100):(0.5-10):(0.1-10):(0.1-5.0):(0.1-5.0) through an extruder, cooling and shaping to form an inner layer pipe, coating the vertically and horizontally winding plasticized steel wire on an external surface of the inner layer pipe, heating a surface of the coated inner layer pipe with infrared rays at 250-285° C., coating a layer of hot-melt adhesive on a surface of the heated pipe by extruding, and then coating an interlayer 21 by extruding which is made from a mixing material with the above chemical composition by weight, coating the vertically and horizontally winding plasticized steel wire on a surface of the interlayer 21, and then heating with infrared rays at 250-285° C., and then coating a layer of hot-melt adhesive by extruding to obtain an intermediate pipe, and then heat-processing a surface of the intermediate pipe, and then recombining a wear-heat-resistant outer layer 3 which is made from a mixing material with the above chemical composition, cooling and finalizing a design to form the steel wire framed pipe; wherein:

the mixing material which is made into the interlayer 21 comprises PE-RT, silane coupling agent, and $SiO_2$ with a weight ratio of (50-100):(0.1-5.0):(0.1-8.0); and the mixing material which is made into the wear-heat-resistant outer layer 3 comprises PE-RT, $SiO_2$, cross-linking agent, antioxidant, and silane coupling agent with a weight ratio of (50-100):(0.1-10):(0.2-0.8):(0.2-1.0):(0.1-5.0).

Technological conditions of the anti-bacterial anti-fouling inner layer 1 are: a mixing temperature of 40-60° C., a mixing cooling temperature of 25-32° C., a pipe production and processing temperature of 160-250° C., a pipe production speed of 0.5-3.0 meter/minute, and a cooling water temperature of 15-32° C.

Technological conditions of the interlayer 21 are that: the plasticized steel wire is heated with infrared rays at 250-285° C., wherein: a mixing temperature is 40-60° C., a mixing cooling temperature is 25-32° C., a pipe production and processing temperature is 140-250° C., and an extruding speed of the interlayer synchronically matches that of the anti-bacterial anti-fouling inner layer.

Technological conditions of the wear-heat-resistant outer layer 3 are: a mixing temperature of 40-60° C., a cooling temperature of 25-32° C., a pipe production and processing temperature of 160-260° C., and a pipe production speed of 0.5-3.0 meter/minute.

When the silane cross-linking method is applied to the wear-heat-resistant outer layer 3, a manufacturing method of the steel wire framed pipe comprises steps of:

step (S11): firstly extruding steel wire via an extruder at 160-250° C., and coating a PE-RT plastic layer with a thickness of 0.1-2.0 mm on a surface of the steel wire to act as a vertically and horizontally winding plasticized steel wire on standby; and step (S12): obtaining a pipe type embryo by extruding a mixing material which is made into an anti-bacterial anti-fouling inner layer 1 and has the above chemical composition by weight through an extruder, cooling and shaping to form an inner layer pipe, coating the vertically and horizontally winding plasticized steel wire on the inner layer pipe, and then coating a layer of hot-melt adhesive by extruding, and then coating an interlayer 21 by extruding which is made from a mixing material with the above chemical composition by weight, coating the vertically and horizontally winding plasticized steel wire on a surface of the interlayer 21, and then coating a layer of hot-melt adhesive by extruding to obtain an intermediate pipe, and then heat-processing a surface of the intermediate pipe, recombining a wear-heat-resistant outer layer 3 which is made from a mixing material with the above chemical composition by weight, cooling and finalizing a design to form the steel wire framed pipe.

Technological conditions of the anti-bacterial anti-fouling inner layer 1 are: a mixing temperature of 40-60° C., a mixing cooling temperature of 25-32° C., a pipe production and processing temperature of 160-250° C., a pipe production speed of 0.5-3.0 meter/minute, and a cooling water temperature of 15-32° C.

Technological conditions of the interlayer 21 are that: the plasticized steel wire is heated with infrared rays at 250-285° C., a mixing temperature is 40-60° C., a mixing cooling temperature is 25-32° C., a pipe production and processing temperature is 140-250° C., and an extruding speed of the interlayer synchronically matches that of the anti-bacterial anti-fouling inner layer.

Technological conditions of the wear-heat-resistant outer layer 3 are: a mixing temperature of 40-60° C., a cooling temperature of 25-32° C., a pipe production and processing temperature of 160-260° C., and a pipe production speed of 0.5-3.0 meter/minute.

After completing the composite pipe, two ends of the pipe within a range of 0.02-0.5 mm are coated with a coating water jacket at a water temperature of 1-10° C., a rest of the pipe without coating the coating water jacket is placed under a steam environment of 80-100° C. for 2-24 hours, for completing an automatic cross-linking.

When the radial cross-linking method is applied to the wear-heat-resistant outer layer 3, a manufacturing method of the steel wire framed pipe comprises steps of:

Step (S21): firstly extruding steel wire via an extruder at 160-250° C., and coating a PE-RT plastic layer with a thickness of 0.1-2.0 mm on a surface of the steel wire to act as a vertically and horizontally winding plasticized steel wire on standby;

Step (S22): obtaining a pipe type embryo by extruding a mixing material which is made into an anti-bacterial anti-fouling inner layer 1 and comprises polyethylene, silicone powders, antibacterial agent, silane coupling agent and $SiO_2$ with a weight ratio of (50-100):(0.5-10):(0.1-10):(0.1-5.0):(0.1-5.0) through an extruder, cooling and shaping to form an inner layer pipe, coating the vertically and horizontally winding plasticized steel wire on the inner layer pipe, and then coating a layer of hot-melt adhesive by extruding, and then coating an interlayer 21 by extruding which is made from a mixing material comprising PE-RT, silane coupling agent, and $SiO_2$ with a weight ratio of (50-100):(0.1-5.0):(0.1-8), coating the vertically and horizontally winding plasticized steel wire on a surface of the interlayer 21, and then coating a layer of hot-melt adhesive by extruding to obtain an intermediate pipe, and then heat-processing a surface of the intermediate pipe, recombining a wear-heat-resistant outer layer 3 which is made from mixing material comprises PE-RT, triallyl isocyanurate, antioxidant, and $SiO_2$ with a weight ratio of (50-100):(1.0-8.0):(0.1-1.0):(0.1-10), cooling and finalizing a design; and step (S23): respectively sheltering two ends of the cooled and finalized pipe within a range of 0.02-0.5 mm, and then under an electron beam energy of 1.5-5.0 MEV, a radiation dose of 100-180 KGY, a radiation dose rate of 11-19 KGY/min, radially cross-linking a surface of the pipe, through an electron accelerator, to obtain an insoluble and non-melting pipe with a three-dimensional net structure, wherein: a crosslink thickness of the surface of the insoluble and non-melting pipe is larger than and equal to 1.5 mm, the surface of the pipe is radially cross-linked, and two ends thereof are partially sheltered, thereby effectively avoiding that the whole pipe turns to be solid melting plastic and is unable to be hot-melt connected at a later period.

Technological conditions of the anti-bacterial anti-fouling inner layer 1 are: a mixing temperature of 40-60° C., a mixing cooling temperature of 25-32° C., a pipe production and processing temperature of 160-250° C., a pipe production speed of 0.5-3.0 meter/minute, and a cooling water temperature of 15-32° C.

Technological conditions of the interlayer 21 are that: the plasticized steel wire is heated with infrared rays at 250-285° C., a mixing temperature is 40-60° C., a mixing cooling temperature is 25-32° C., a pipe production and processing temperature is 160-250° C., and an extruding speed of the interlayer synchronically matches that of the anti-bacterial anti-fouling inner layer.

Technological conditions of the wear-heat-resistant outer layer 3 are: a mixing temperature of 40-60° C., a cooling temperature of 25-32° C., a pipe production and processing temperature of 160-250° C., and a pipe production speed of 0.5-3.0 meter/minute.

The steel wire framed pipe, provided by the present invention, is further explained with accompanying embodiments.

The silane coupling agent adopted by the present invention is N-(β-aminoethyl) amino-gamma-aminopropyltriethoxysilane (KH-791, produced by Nanjing Jingtianwei Chemical Co., Ltd, China). The silane cross-linking agent is methyl triethoxysilane (DMT-150, produced by Nanjing Diamond Chemical Co., Ltd, China) or methyltris(methylethylketoximino)silane (DMT-30, produced by Nanjing Diamond Chemical Co., Ltd, China). The hot-melt adhesive is the 3220 specified hot-melt adhesive, produced by Shanghai Bangzhong Macromolecule Material Co., Ltd, China).

Here, it is noted that, unless specially indicated sources, agents and test equipments used in the present invention, are commercially available on the market. Experimental methods, whose specific conditions are not indicated, in the embodiments of the present invention, are generally in accordance with conventional conditions, or raw materials or conditions recommended by the manufacturer.

Embodiment 1:

The wear-heat-resistant outer layer 3 is made from a mixing material which comprises PE-RT, $SiO_2$, dicumyl peroxide cross-linking agent, tetra [β-(3,5-di-tert-butyl-4-hydroxyphenyl) propionate] pentaerythritol ester antioxidant, and N-(β-aminoethyl) amino-gamma-aminopropyltriethoxysilane silane coupling agent with a weight ratio of 50:0.5:0.2:0.2:1;

the anti-bacterial anti-fouling inner layer 1 is made from a mixing material which comprises polyethylene, silicone powders, zinc oxide antibacterial agent, N-(β-aminoethyl) amino-gamma-aminopropyltriethoxysilane silane coupling agent and $SiO_2$ with a weight ratio of 100:0.5:0.5:5.0:5.0;

the interlayer 21 is made from a mixing material which comprises PE-RT, N-(β-aminoethyl) amino-gamma-aminopropyltriethoxysilane silane coupling agent, and $SiO_2$ with a weight ratio of 100:0.1:8.0.

A manufacturing method of the steel wire framed pipe comprises steps of:

step (S11): firstly extruding steel wire via an extruder at 160° C., and coating a PE-RT plastic layer with a thickness of 2.0 mm on a surface of the steel wire to act as a vertically and horizontally winding plasticized steel wire on standby; and step (S12): obtaining a pipe type embryo by extruding a mixing material which is made into an anti-bacterial anti-fouling inner layer 1 and comprises polyethylene, silicone powders, zinc oxide, silver ion, N-(β-aminoethyl) amino-gamma-aminopropyltriethoxysilane silane coupling agent and $SiO_2$ with a weight ratio of 100:0.5:0.25:0.25:5.0:5.0 through an extruder, cooling and shaping to form an inner layer pipe, wherein technical conditions of the inner layer pipe are: a mixing temperature of 60° C., a mixing cooling temperature of 32° C., a pipe production and processing temperature of 250° C., a pipe production speed of 3.0 meter/minute, and a cooling water temperature of 32° C.;

coating the vertically and horizontally winding plasticized steel wire on the inner layer pipe, heating a surface of the coated inner layer pipe with infrared rays at 250° C., coating a layer of hot-melt adhesive on a surface of the heated pipe by extruding, and then coating an interlayer 21 by extruding which is made from a mixing material comprising PE-RT, N-(β-aminoethyl) amino-gamma-aminopropyltriethoxysilane silane coupling agent and $SiO_2$ with a weight ratio of 100:0.1:8, wherein technological conditions of the interlayer 21 are a mixing temperature of 40° C., a mixing cooling temperature of 25° C., a pipe production and processing temperature of 180° C., and an extruding speed of the interlayer synchronically matches that of the anti-bacterial anti-fouling inner layer;

coating the vertically and horizontally winding plasticized steel wire on a surface of the interlayer 21, and then heating with infrared rays at 285° C., and then coating a layer of hot-melt adhesive by extruding to obtain an intermediate pipe, and then heat-processing a surface of the intermediate pipe, recombining a wear-heat-resistant outer layer 3 which is made from a mixing material comprising PE-RT, $SiO_2$, dicumyl peroxide, tetra [β-(3,5-di-tert-butyl-4-hydroxyphenyl) propionate] pentaerythritol ester, and N-(β-aminoethyl) amino-gamma-aminopropyltriethoxysilane with a weight ratio of 50:0.5:0.2:0.2:1, cooling and finalizing a design to form the steel wire framed pipe; wherein technological conditions of the wear-heat-resistant outer layer 3 are: a mixing temperature of 60° C., a cooling temperature of 32° C., a pipe production and processing temperature of 260° C., and a pipe production speed of 3.0 meter/minute.

Embodiment 2:

The wear-heat-resistant outer layer 3 is made from a mixing material which comprises PE-RT, methyl triethoxysilane silane cross-linking agent, n-octadecyl (3-[3,5-di-tert-butyl-4-hydroxyphenyl]propionate) antioxidant, and N-(β-aminoethyl) amino-gamma-aminopropyltriethoxysilane silane coupling agent with a weight ratio of 75:0.1:0.5:0.1.

The anti-bacterial anti-fouling inner layer 1 is made from a mixing material which comprises polyethylene, silicone powders, ammonium biphosphate antibacterial agent, N-(β-aminoethyl) amino-gamma-aminopropyltriethoxysilane silane coupling agent and $SiO_2$ with a weight ratio of 50:5:0.1:2.5:3.

The interlayer 21 is made from a mixing material which comprises PE-RT, N-(β-aminoethyl) amino-gamma-aminopropyltriethoxysilane silane coupling agent, and $SiO_2$ with a weight ratio of 100:5:4.

A manufacturing method of the steel wire framed pipe comprises steps of:

step (S11): firstly extruding steel wire via an extruder at 200° C., and coating a PE-RT plastic layer with a thickness of 2.0 mm on a surface of the steel wire to act as a vertically and horizontally winding plasticized steel wire on standby; and step (S12): obtaining a pipe type embryo by extruding a mixing material which is made into an anti-bacterial anti-fouling inner layer 1 and comprises polyethylene, silicone powders, antibacterial agent, silane coupling agent and $SiO_2$ with a weight ratio of 50:5:0.1:2.5:3 through an extruder, cooling and shaping to form an inner layer pipe, wherein technical conditions of the inner layer pipe are: a mixing temperature of 50° C., a mixing cooling temperature of 25° C., a pipe production and processing temperature of 180° C., a pipe production speed of 0.5 meter/minute, and a cooling water temperature of 15° C.;

coating the vertically and horizontally winding plasticized steel wire on a surface of the inner layer pipe, heating the plasticized steel wire with infrared rays at 285° C., coating a layer of hot-melt adhesive by extruding, and then coating an interlayer 21 by extruding which is made from a mixing material comprising PE-RT, silane coupling agent and $SiO_2$ with a weight ratio of 100:5:4, wherein technological conditions of the interlayer 21 are a mixing temperature of 60° C., a mixing cooling temperature of 32° C., a pipe production and processing temperature of 250° C., and an extruding speed of the interlayer synchronically matches that of the anti-bacterial anti-fouling inner layer;

coating the vertically and horizontally winding plasticized steel wire on a surface of the interlayer 21, and then coating a layer of hot-melt adhesive by extruding to obtain an intermediate pipe, and then heat-processing a surface of the intermediate pipe, recombining a wear-heat-resistant outer layer 3 which is made from a mixing material comprising PE-RT, silane cross-linking agent, antioxidant, and silane coupling agent with a weight ratio of 75:0.1:0.5:0.1, cooling and finalizing a design to form the steel wire framed pipe; wherein technological conditions of the wear-heat-resistant outer layer 3 are: a mixing temperature of 40° C., a cooling temperature of 25° C., a pipe production and processing temperature of 200° C., and a pipe production speed of 2.0 meter/minute;

after completing the composite pipe, coating two ends of the pipe within a range of 0.02 mm with a coating water jacket at a water temperature of 5° C., and placing a rest of the pipe without coating the coating water jacket under a steam environment of 80° C. for 2 hours, for completing an automatic cross-linking.

Embodiment 3:

The wear-heat-resistant outer layer 3 is made from a mixing material which comprises PE-RT, methyltris(methylethylketoxime)silane cross-linking agent, phosphite tri-(2,4-di-tert-butyl benzene) ester antioxidant, and N-(β-aminoethyl) amino-gamma-aminopropyltriethoxysilane silane coupling agent with a weight ratio of 100:5:1:5.

The anti-bacterial anti-fouling inner layer 1 is made from a mixing material which comprises polyethylene, silicone powders, copper oxide antibacterial agent, vanillin, N-(β-aminoethyl) amino-gamma-aminopropyltriethoxysilane silane coupling agent and $SiO_2$ with a weight ratio of 100:10:5:5:5:5.

The interlayer 21 is made from a mixing material which comprises PE-RT, N-(β-aminoethyl) amino-gamma-aminopropyltriethoxysilane silane coupling agent, and $SiO_2$ with a weight ratio of 50:0.1:5.0.

A manufacturing method of the steel wire framed pipe comprises steps of:

step (S11): firstly extruding steel wire via an extruder at 200° C., and coating a PE-RT plastic layer with a thickness of 2.0 mm on a surface of the steel wire to act as a vertically and horizontally winding plasticized steel wire on standby; and step (S12): obtaining a pipe type embryo by extruding a mixing material which is made into an anti-bacterial anti-fouling inner layer 1 and comprises polyethylene, silicone powders, antibacterial agent, silane coupling agent and $SiO_2$ with a weight ratio of 100:10:10:5:5 through an extruder, cooling and shaping to form an inner layer pipe, wherein technical conditions of the inner layer pipe are: a mixing temperature of 40° C., a mixing cooling temperature of 30° C., a pipe production and processing temperature of 170° C., a pipe production speed of 2.0 meter/minute, and a cooling water temperature of 25° C.;

coating the vertically and horizontally winding plasticized steel wire on a surface of the inner layer pipe, heating the plasticized steel wire with infrared rays at 260° C., coating a layer of hot-melt adhesive by extruding, and then coating an interlayer 21 by extruding which is made from a mixing material and comprises PE-RT, silane coupling agent and $SiO_2$ with a weight ratio of 50:0.15, wherein technological conditions of the interlayer 21 are a mixing temperature of 50° C., a mixing cooling temperature of 30° C., a pipe production and processing temperature of 200° C., and an extruding speed of the interlayer synchronically matches that of the anti-bacterial anti-fouling inner layer;

coating the vertically and horizontally winding plasticized steel wire on a surface of the interlayer 21, and then coating a layer of hot-melt adhesive by extruding to obtain an intermediate pipe, and then heat-processing a surface of the intermediate pipe, recombining a wear-heat-resistant outer layer 3 which is made from a mixing material and comprises PE-RT, silane cross-linking agent, antioxidant, and silane coupling agent with a weight ratio of 100:5:1:5, cooling and finalizing a design to form the steel wire framed pipe; wherein technological conditions of the wear-heat-resistant outer layer 3 are: a mixing temperature of 60° C., a cooling temperature of 32° C., a pipe production and processing temperature of 180° C., and a pipe production speed of 3.0 meter/minute;

after completing the composite pipe, coating two ends of the pipe within a range of 0.5 mm with a coating water jacket at a water temperature of 10° C., and placing a rest of the pipe without coating the coating water jacket under a steam environment of 100° C. for 24 hours, for completing an automatic cross-linking.

Embodiment 4:

The wear-heat-resistant outer layer 3 is made from a mixing material which comprises PE-RT, triallyl isocyanurate, phosphite tri-(2,4-di-tert-butyl benzene) ester antioxidant, and $SiO_2$ with a weight ratio of 100:1:1:5.

The anti-bacterial anti-fouling inner layer 1 is made from a mixing material which comprises polyethylene, silicone powders, acetanilide antibacterial agent, phenol, N-(β-aminoethyl) amino-gamma-aminopropyltriethoxysilane silane coupling agent and $SiO_2$ with a weight ratio of 80:10:5:5:0.1:0.1.

The interlayer 21 is made from a mixing material which comprises PE-RT, N-(β-aminoethyl) amino-gamma-aminopropyltriethoxysilane silane coupling agent, and $SiO_2$ with a weight ratio of 50:3:0.1.

A manufacturing method of the steel wire framed pipe comprises steps of:

step (S21): firstly extruding steel wire via an extruder at 250° C., and coating a PE-RT plastic layer with a thickness of 0.16 mm on a surface of the steel wire to act as a vertically and horizontally winding plasticized steel wire on standby;

step (S22): obtaining a pipe type embryo by extruding a mixing material which is made into an anti-bacterial anti-fouling inner layer 1 and comprises polyethylene, silicone powders, antibacterial agent, silane coupling agent and $SiO_2$ with a weight ratio of 80:10:10:0.1:0.1 through an extruder, cooling and shaping to form an inner layer pipe, wherein technical conditions of the inner layer pipe are: a mixing temperature of 45° C., a mixing cooling temperature of 30° C., a pipe production and processing temperature of 160° C., a pipe production speed of 2.0 meter/minute, and a cooling water temperature of 18° C.;

coating the vertically and horizontally winding plasticized steel wire on a surface of the inner layer pipe, heating the plasticized steel wire with infrared rays at 270° C., coating a layer of hot-melt adhesive by extruding, and then coating an interlayer 21 by extruding which is made from a mixing material comprising PE-RT, silane coupling agent and $SiO_2$ with a weight ratio of 50:3:0.1, wherein technological conditions of the interlayer 21 are a mixing temperature of 45° C., a mixing cooling temperature of 30° C., a pipe production and processing temperature of 170° C., and an extruding speed of the interlayer synchronically matches that of the anti-bacterial anti-fouling inner layer;

coating the vertically and horizontally winding plasticized steel wire on a surface of the interlayer 21, and then coating a layer of hot-melt adhesive by extruding to obtain an intermediate pipe, and then heat-processing a surface of the intermediate pipe, recombining a wear-heat-resistant outer layer 3 which is made from a mixing material comprising PE-RT, triallyl isocyanurate, $SiO_2$ and antioxidant with a weight ratio of 100:1:5:1, cooling and finalizing a design; wherein technological conditions of the wear-heat-resistant outer layer 3 are: a mixing temperature of 50° C., a cooling temperature of 30° C., a pipe production and processing temperature of 200° C., and a pipe production speed of 2.0 meter/minute; and step (S23): respectively sheltering two ends of the cooled and finalized pipe within a range of 0.5 mm, and then under an electron beam energy of 1.5 MEV, a radiation dose of 100 KGY, a radiation dose rate of 11 KGY/min, radially cross-linking a surface of the pipe, through an electron accelerator, to obtain an insoluable and non-melting pipe with a three-dimensional net structure, wherein: a crosslink thickness of the surface of the insoluable and non-melting pipe is 1.5 mm, and two ends of the pipe are partially sheltered, thereby effectively avoiding that the whole pipe turns to be solid melting plastic and is unable to be hot-melt connected at a later period.

Embodiment 5:

The wear-heat-resistant outer layer 3 is made from a mixing material which comprises PE-RT, triallyl isocyanurate, phosphite tri-(2,4-di-tert-butyl benzene) ester antioxidant, and $SiO_2$ with a weight ratio of 50:8:0.1:10.

The anti-bacterial anti-fouling inner layer 1 is made from a mixing material which comprises polyethylene, silicone powders, lithium carbonate antibacterial agent, miconazole, N-(β-aminoethyl) amino-gamma-aminopropyltriethoxysilane silane coupling agent and $SiO_2$ with a weight ratio of 70:8:2:2:3:3.

The interlayer 21 is made from a mixing material which comprises PE-RT, N-(β-aminoethyl) amino-gamma-aminopropyltriethoxysilane silane coupling agent, and $SiO_2$ with a weight ratio of 60:0.2:5.

A manufacturing method of the steel wire framed pipe comprises steps of:

step (S21): firstly extruding steel wire via an extruder at 250° C., and coating a PE-RT plastic layer with a thickness of 0.2 mm on a surface of the steel wire to act as a vertically and horizontally winding plasticized steel wire on standby;

step (S22): obtaining a pipe type embryo by extruding a mixing material which is made into an anti-bacterial anti-fouling inner layer 1 and comprises polyethylene, silicone powders, antibacterial agent, silane coupling agent and $SiO_2$ with a weight ratio of 70:8:4:3:3 through an extruder, cooling and shaping to form an inner layer pipe, wherein technical conditions of the inner layer pipe are: a mixing temperature of 60° C., a mixing cooling temperature of 32° C., a pipe production and processing temperature of 250° C., a pipe production speed of 3.0 meter/minute, and a cooling water temperature of 32° C.;

coating the vertically and horizontally winding plasticized steel wire on a surface of the inner layer pipe, heating the plasticized steel wire with infrared rays at 250° C., coating a layer of hot-melt adhesive by extruding, and then coating an interlayer 21 by extruding which is made from a mixing material comprising PE-RT, silane coupling agent and $SiO_2$ with a weight ratio of 60:0.2:5, wherein technological conditions of the interlayer 21 are a mixing temperature of 45° C., a mixing cooling temperature of 32° C., a pipe production and processing temperature of 200° C., and an extruding speed of the interlayer synchronically matches that of the anti-bacterial anti-fouling inner layer;

coating the vertically and horizontally winding plasticized steel wire on a surface of the interlayer 21, and then coating a layer of hot-melt adhesive by extruding to obtain an intermediate pipe, and then heat-processing a surface of the intermediate pipe, recombining a wear-heat-resistant outer layer 3 which is made from a mixing material comprising PE-RT, triallyl isocyanurate, antioxidant and $SiO_2$ with a weight ratio of 50:1:1:10, cooling and finalizing a design; wherein technological conditions of the wear-heat-resistant outer layer 3 are: a mixing temperature of 60° C., a cooling temperature of 32° C., a pipe production and processing temperature of 250° C., and a pipe production speed of 3.0 meter/minute; and step (S23): respectively sheltering two ends of the cooled and finalized pipe within a range of 0.02 mm, and then under an electron beam energy of 5.0 MEV, a radiation dose of 180 KGY, a radiation dose rate of 19 KGY/min, radially cross-linking a surface of the pipe, through an electron accelerator, to obtain an insoluable and non-melting pipe with a three-dimensional net structure, wherein: a crosslink thickness of the surface of the insoluable and non-melting pipe is 2.5 mm, and two ends of the pipe are partially sheltered, thereby effectively avoiding that the whole pipe turns to be solid melting plastic and is unable to be hot-melt connected at a later period.

Embodiment 6:

The wear-heat-resistant outer layer 3 is made from a mixing material which comprises PE-RT, triallyl isocyanurate, antioxidant, and $SiO_2$ with a weight ratio of 80:2:0.8:0.1, wherein the antioxidant is a mixture of tris(2,4-ditert-butylphenyl) phosphite, tetra [β-(3,5-di-tert-butyl-4-hydroxyphenyl) propionate] pentaerythritol ester and n-octadecyl (3-[3,5-di-tert-butyl-4-hydroxyphenyl]propionate) antioxidant.

The anti-bacterial anti-fouling inner layer 1 is made from a mixing material which comprises polyethylene, silicone powder, dodecyl trimethyl ammonium chloride antibacterial agent, N-(β-aminoethyl) amino-gamma-aminopropyltriethoxysilane silane coupling agent and $SiO_2$ with a weight ratio of 50:0.5:0.1:5:5.

The interlayer 21 is made from a mixing material which comprises PE-RT, N-(β-aminoethyl) amino-gamma-aminopropyltriethoxysilane silane coupling agent, and $SiO_2$ with a weight ratio of 100:0.1:8.

A manufacturing method of the steel wire framed pipe comprises steps of:

Step (S21): firstly extruding steel wire via an extruder at 175° C., and coating a PE-RT plastic layer with a thickness of 0.18 mm on a surface of the steel wire to act as a vertically and horizontally winding plasticized steel wire on standby;

Step (S22): obtaining a pipe type embryo by extruding a mixing material which is made into an anti-bacterial anti-fouling inner layer 1 and comprises polyethylene, silicone powders, antibacterial agent, silane coupling agent and $SiO_2$ with a weight ratio of 50:0.5:0.1:5:5 through an extruder, cooling and shaping to form an inner layer pipe, wherein technical conditions of the inner layer pipe are: a mixing temperature of 40° C., a mixing cooling temperature of 25° C., a pipe production and processing temperature of 178° C., a pipe production speed of 0.5 meter/minute, and a cooling water temperature of 15° C.;

coating the vertically and horizontally winding plasticized steel wire on a surface of the inner layer pipe, heating the plasticized steel wire with infrared rays at 250° C., coating a layer of hot-melt adhesive by extruding, and then coating an interlayer 21 by extruding which is made from a mixing material and comprises PE-RT, silane coupling agent and $SiO_2$ with a weight ratio of 50:0.1:7, wherein technological conditions of the interlayer 21 are a mixing temperature of 50° C., a mixing cooling temperature of 25° C., a pipe production and processing temperature of 180° C., and an extruding speed of the interlayer synchronically matches that of the anti-bacterial anti-fouling inner layer;

coating the vertically and horizontally winding plasticized steel wire on a surface of the interlayer 21, and then coating a layer of hot-melt adhesive by extruding to obtain an intermediate pipe, and then heat-processing a surface of the intermediate pipe, recombining a wear-heat-resistant outer layer 3 which is made from a mixing material comprising PE-RT, triallyl isocyanurate, antioxidant and $SiO_2$ with a weight ratio of 100:2:0.8:5, cooling and finalizing a design; wherein technological conditions of the wear-heat-resistant outer layer 3 are: a mixing temperature of 40° C., a cooling temperature of 25° C., a pipe production and processing temperature of 180° C., and a pipe production speed of 0.5 meter/minute; and step (S23): respectively sheltering two ends of the cooled and finalized pipe within a range of 0.5 mm, and then under an electron beam energy of 4.0 MEV, a radiation dose of 150 KGY, a radiation dose rate of 15 KGY/min, radially cross-linking a surface of the pipe, through an electron accelerator, to obtain an insoluable and non-melting pipe with a three-dimensional net structure, wherein: a crosslink thickness of the surface of the insoluable and non-melting pipe is 5 mm, and two ends of the pipe are partially sheltered, thereby effectively avoiding that the whole pipe turns to be solid melting plastic and is unable to be hot-melt connected at a later period.

Compared with the existing steel wire framed pipes, the steel wire framed pipes manufactured by six preferred embodiments of the present invention have some performance indexes as shown in Table below.

| Indexes | Prior arts | Embodiment 1 | Embodiment 2 | Embodiment 3 | Embodiment 4 | Embodiment 5 | Embodiment 6 |
|---|---|---|---|---|---|---|---|
| Burst pressure (Mpa) | 5.53 | 6.12 | 6.86 | 7.85 | 6.88 | 6.37 | 7.02 |
| Working pressure (Mpa) | 3.5 | 4.55 | 4.58 | 4.65 | 4.21 | 4.32 | 4.58 |
| Using temperature at the same pressure (° C.) | 40 | 60 | 60 | 60 | 60 | 60 | 60 |
| Scratch Rapid cracking Time (hour) | 8000 | 12000 | 12000 | 12000 | 11000 | 12000 | 10500 |
| Heat resistant rigidity (60° C., 2 h regulation) $KN/M^2$ | 11 | 16.2 | 16.8 | 17.2 | 16.68 | 17.1 | 17 |
| Antibacterial performance test | ≥82 | ≥93 | ≥97 | ≥99 | ≥97 | ≥97 | ≥94 |
| Fouling time in sewage (hour) | 5000 | 8000 | 8500 | 9000 | 9500 | 8600 | 8900 |
| Ratio of wear-resistant performance to change rate of wall thickness | 1.50% | 1.30% | 1.10% | 1.15% | 1.05% | 1.20% | 1.20% |
| Oxidation induction time (min) | 40 | 75 | 85 | 90 | 92 | 92.8 | 116 |
| Service life (year) | 50 | 60 | 60 | 60 | 60 | 60 | 60 |

(1) Test method of scratch rapid cracking time: a scratch depth of a surface of the pipe is 0.05-2.0 mm, the pipe is placed at 60° C. for 24 hours, and then placed at 0° C. for 24 hours, and then placed at natural lighting for 24 hours, and then placed to water at a room temperature of 23° C. for 24 hours. These four methods are repeated and recycled for contrast.

(2) Experimental method of wear-resistant performance: the outer layer is produced to the solid wall pipe, the degree of cross-linking of the chemical cross-linking and the radial cross-linking is controlled to 30%-45%; tailings which contain water are conveyed at 20-25° C., and then the change rate of the wall thickness is tested after one month.

Test methods of other performance indexes are performed according to conventional experiments or methods.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A wear-heat-resistant anti-bacterial anti-fouling steel wire framed pipe, comprising: an anti-bacterial anti-fouling inner layer (1), an enhancement layer (2) and a wear-heat-resistant outer layer (3) from inside to outside in turn, wherein:
the anti-bacterial anti-fouling inner layer (1) is made from antifouling and antibacterial composite modified polyethylene; the wear-heat-resistant outer layer (3) is made from wear-resistant cross-linked modified PE-RT; the enhancement layer (2) comprises an interlayer (21) and two steel wire gauze layers (22) respectively coating on an inner surface and an outer surface of the interlayer, and the interlayer (21) is respectively bonded with the anti-bacterial anti-fouling inner layer (1) and the wear-heat-resistant outer layer (3) via hot-melt adhesive;
the interlayer (21) is made from a mixing material which comprises PE-RT, silane coupling agent, and $SiO_2$ with a weight ratio of 50-100 wt % to 0.1-5.0 wt % to 0.1-8.0 wt %;
the anti-bacterial anti-fouling inner layer (1) is made from a mixing material which comprises polyethylene, silicone powders, antibacterial agent, silane coupling agent and $SiO_2$ with a weight ratio of 50-100 wt % to 0.5-10 wt % to 0.1-10 wt % to 0.1-5.0 wt % to 0.1-5.0 wt %.

2. The wear-heat-resistant anti-bacterial anti-fouling steel wire framed pipe, as recited in claim 1, wherein: the wear-heat-resistant outer layer (3) is made from a mixing material which comprises PE-RT, silane cross-linking agent, antioxidant, and silane coupling agent with a weight ratio of 50-100 wt % to 0.1-8.0 wt % to 0.2-1.0 wt % to 0.1-5.0 wt %.

3. The wear-heat-resistant anti-bacterial anti-fouling steel wire framed pipe, as recited in claim 1, wherein: the wear-heat-resistant outer layer (3) is made from a mixing material which comprises PE-RT, triallyl isocyanurate, antioxidant, and $SiO_2$ with a weight ratio of 50-100 wt % to 1.0-8.0 wt % to 0.1-1.0 wt % to 0.1-10.0 wt %.

4. A manufacturing method of the wear-heat-resistant anti-bacterial anti-fouling steel wire framed pipe as recited in claim 2, comprising steps of:
step (S11): firstly extruding steel wire via an extruder at 160-250° C., and coating a PE-RT plastic layer with a thickness of 0.1-2.0 mm on a surface of the steel wire to act as a vertically and horizontally winding plasticized steel wire on standby; and
step (S12): obtaining a pipe type embryo by extruding a mixing material which has the chemical composition by weight and is made into an anti-bacterial anti-fouling inner layer (1) through an extruder, cooling and shaping to form an inner layer pipe, coating the vertically and horizontally winding plasticized steel wire on an external surface of the inner layer pipe, and then coating a layer of hot-melt adhesive by extruding, and then coating an interlayer (21) by extruding which is made from a mixing material with the chemical composition by weight, coating the vertically and horizontally winding plasticized steel wire on a surface of the interlayer (21), and then coating a layer of hot-melt adhesive by extruding to obtain an intermediate pipe, heat-processing a surface of the intermediate pipe, recombining a wear-heat-resistant outer layer (3) which is made from a mixing material with the above chemical composition by weight, cooling and finalizing a design to form the steel wire framed pipe; wherein:
technological conditions of the wear-heat-resistant outer layer (3) are: a mixing temperature of 40-60° C., a cooling temperature of 25-32° C., a pipe production and processing temperature of 160-260° C., and a pipe production speed of 0.5-3.0 meter/minute; and
after completing the composite pipe, coating two ends of the pipe within a range of 0.02-0.5 mm with a coating water jacket at a water temperature of 1-10° C., placing a rest of the pipe without coating the coating water jacket under a steam environment of 80-100° C. for 2-24 hours, for completing an automatic cross-linking.

5. The manufacturing method, as recited in claim 4, wherein:
technological conditions of the anti-bacterial anti-fouling inner layer (1) are: a mixing temperature of 40-60° C., a mixing cooling temperature of 25-32° C., a pipe production and processing temperature of 160-250° C., a pipe production speed of 0.5-3.0 meter/minute, and a cooling water temperature of 15-32° C.; and
technological conditions of the interlayer (21) are that: the plasticized steel wire is heated with infrared rays at 250-285° C., wherein: a mixing temperature is 40-60° C., a mixing cooling temperature is 25-32° C., a pipe production and processing temperature is 160-250° C., and an extruding speed of the interlayer synchronically matches that of the anti-bacterial anti-fouling inner layer.

6. A manufacturing method of the wear-heat-resistant anti-bacterial anti-fouling steel wire framed pipe as recited in claim 3, comprising steps of:
step (S21): firstly extruding steel wire through an extruder at 160-250° C., and coating a PE-RT plastic layer with a thickness of 0.1-2.0 mm on a surface of the steel wire to act as a vertically and horizontally winding plasticized steel wire on standby;
step (S22): obtaining a pipe type embryo by extruding a mixing material which has the chemical composition by weight and is made into an anti-bacterial anti-fouling inner layer (1) through an extruder, cooling and forming an inner layer pipe, coating the vertically and horizontally winding plasticized steel wire on the inner layer pipe, and then coating a layer of hot-melt adhesive by extruding, and then coating an interlayer (21) by extruding which is made from a mixing material with the chemical composition by weight, coating the vertically and horizontally winding plasticized steel wire on the interlayer (21), and then coating a layer of hot-melt adhesive by extruding to obtain an intermediate pipe, heat-processing a surface of the intermediate pipe, recombining a wear-heat-resistant outer layer (3) which is made from a mixing material with the above chemical composition by weight, cooling and finalizing a design, wherein:
technological conditions of the wear-heat-resistant outer layer (3) are: a mixing temperature of 40-60° C., a mixing cooling temperature of 25-32° C., a pipe production and processing temperature of 150-250° C., and a pipe production speed of 0.5-3.0 meter/minute; and
step (S23): respectively sheltering two ends of the cooled and finalized pipe within a range of 0.02-0.5 mm, and then under an electron beam energy of 1.5-5.0 MEV, a radiation dose of 100-180 KGY, a radiation dose rate of 11-19 KGY/min, radially cross-linking a surface of the pipe, through an electron accelerator, to obtain a non-melting pipe with a three-dimensional net structure, wherein: a crosslink thickness of the surface of the non-melting pipe is larger than and equal to 1.5 mm.

7. The manufacturing method, as recited in claim 6, wherein:

technological conditions of the anti-bacterial anti-fouling inner layer (1) are: a mixing temperature of 40-60° C., a mixing cooling temperature of 25-32° C., a pipe production and processing temperature of 160-250° C., a pipe production speed of 0.5-3.0 meter/minute, and a cooling water temperature of 15-32° C.; and technological conditions of the interlayer (21) are that: the plasticized steel wire is heated with infrared rays at 250-285° C., wherein: a mixing temperature is 40-60° C., a mixing cooling temperature is 25-32° C., a pipe production and processing temperature is 160-250° C., and an extruding speed of the interlayer synchronically matches that of the anti-bacterial anti-fouling inner layer.

\* \* \* \* \*